US007106730B1

(12) United States Patent
Bass et al.

(10) Patent No.: US 7,106,730 B1
(45) Date of Patent: Sep. 12, 2006

(54) METHOD AND APPARATUS FOR PROCESSING FRAME CLASSIFICATION INFORMATION BETWEEN NETWORK PROCESSORS

(75) Inventors: Brian Mitchell Bass, Apex, NC (US); Jean Louis Calvignac, Cary, NC (US); Anthony Matteo Gallo, Apex, NC (US); Marco C. Heddes, Raleigh, NC (US); Michael Steven Siegel, Raleigh, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/546,833

(22) Filed: Apr. 11, 2000

(51) Int. Cl.
*H04L 12/56* (2006.01)

(52) U.S. Cl. .................................................. 370/389

(58) Field of Classification Search ................ 370/412, 370/388–392, 470–476, 389, 235, 236, 469; 209/238, 243–245
See application file for complete search history.

(56) References Cited

U.S. PATENT DOCUMENTS

| | | | | |
|---|---|---|---|---|
| 5,982,775 A * | 11/1999 | Brunner et al. | ............ | 370/401 |
| 6,088,355 A * | 7/2000 | Mills et al. | ................ | 370/392 |
| 6,208,650 B1 * | 3/2001 | Hassell et al. | ............ | 370/392 |
| 6,272,134 B1 * | 8/2001 | Bass et al. | ................. | 370/390 |
| 6,278,709 B1 * | 8/2001 | Walker et al. | ............ | 370/392 |
| 6,295,296 B1 * | 9/2001 | Tappan | ...................... | 370/392 |
| 6,320,864 B1 * | 11/2001 | Hebb et al. | ................ | 370/412 |
| 6,404,752 B1 * | 6/2002 | Allen et al. | ................ | 370/335 |
| 6,512,766 B1 * | 1/2003 | Wilford | ..................... | 370/389 |
| 6,574,194 B1 * | 6/2003 | Sun et al. | ................... | 370/235 |
| 6,587,431 B1 * | 7/2003 | Almulhem et al. | ........ | 370/229 |
| 6,760,776 B1 * | 7/2004 | Gallo et al. | ................ | 370/392 |
| 6,775,284 B1 * | 8/2004 | Calvignac et al. | ......... | 370/392 |
| 2004/0228339 A1 * | 11/2004 | Gallo et al. | ................ | 370/379 |

\* cited by examiner

*Primary Examiner*—Chi Pham
*Assistant Examiner*—Anh-Vu Ly
(74) *Attorney, Agent, or Firm*—Joscelyn G. Cockburn

(57) ABSTRACT

A network device including an ingress processor and egress processor which receives frames of data over the network on an input port, and transfers it to an appropriate output port. The received frame is processed by an ingress processor which prepares an intra-switch frame for delivery to an egress processor serving a relevant output port of the switch. The intra-switch frame includes a frame header having parameters which have been determined by the ingress processor, as well as data indicating an address for the egress processor for beginning processing of the frame. By identifying to the egress processor processing which has already taken place, the egress processor is relieved of any redundant processing of the frame. The egress processor provides a hardware frame classifier which decodes the information contained in the intra-frame header to derive parameters which have been previously computed as well as a starting address for the egress processor. By reducing the amount of redundant processing of the egress processor, total device throughput delay is reduced.

14 Claims, 3 Drawing Sheets

METHOD AND APPARATUS FOR PROCESSING FRAME CLASSIFICATION INFORMATION BETWEEN NETWORK PROCESSORS

BACKGROUND OF THE INVENTION

The present invention relates to network processors which transfer network data frames between nodes of a network. Specifically, a process and apparatus for supplying frame type information and information identifying the depth of processing of an ingress processor to an egress processor of a network node is described which avoids redundant frame processing.

Communication network systems transfer information between a source and destination in frames which are transferred between different nodes along the network. The frames contain data destined for the user as well as destination information and other information which is needed for later processing downstream. One of the more common devices for transferring frames of data between nodes is the multi-processor switch. The multiprocessor switch is organized as a series of blades for receiving traffic through multiple ports, and for delivering traffic through other ports on the same or different blades of the switch. The blades typically have an ingress processor associated with them which processes incoming frames by correlating the frame destination with an output port, determining from the frame various parameters which are needed to process the frame, and transferring the processed frame to an egress processor on the same or a different blade. The egress processor may share the same hardware as the ingress processor and run a different set of pico code instructions when it is forwarding frames to an output port of the same blade.

Incoming frames are processed by the ingress processor by parsing the contents of the header, determining a destination for the frame, and then handing off the frame to the appropriate egress processor for processing and forwarding to an appropriate output port. The processing of frames by the ingress and egress processor necessarily requires redundant processing of the frame as it is handed off from the ingress processor to the egress processor. Parsing of header information from the received frame, identifying the frame type as well as other control parameters is part of a frame classification process executed in both the ingress and egress processor. The redundant processing of the frame produces delays in overall device throughput degrading the device performance. The present invention is directed to a system and method which will avoid redundant processing by the egress processor which has previously taken place in the ingress processor.

SUMMARY OF THE INVENTION

The present invention provides for the more efficient processing of frames which are being transferred within a network device such as a network switch. The network device includes an ingress processor which receives the network frames on the input ports. The ingress processor parses the frame parameters and prepares an intra-switch frame for delivery to an egress processor of the switch. The intra-switch frame includes a frame header identifying the type of frame received from the input port, parameters which have already been determined by the ingress processor, a level of processing which has been conducted on the frame and a multicast/unicast control bit. The multicast/unicast control bit identifies to the egress processor whether or not one or more frames are to be prepared for multiple ports on the network switch. The intra-switch frame is passed to the egress processor which is associated with one or more output ports on the network switch, which transfers the frame to a port identified from information contained within the incoming frame. The egress processor completes processing of the frame from program instructions which may have a starting address identified by the header data, reflecting the level of processing carried out on the frame by the ingress processor, and from passed parameters which were previously determined by the ingress processor. In this way, the egress processor need not perform redundant processing of a frame which was previously carried out by the ingress processor.

In one embodiment of the invention, the frame header data is decoded in a hardware classifier logic circuit, while header data is stored in memory by the egress processor, to locate the starting address for the egress processor.

In the other embodiments of the invention, the intra-switch frame header may include other control parameters determined by the ingress processor.

DESCRIPTION OF THE PREFERRED EMBODIMENT

Figure 1:
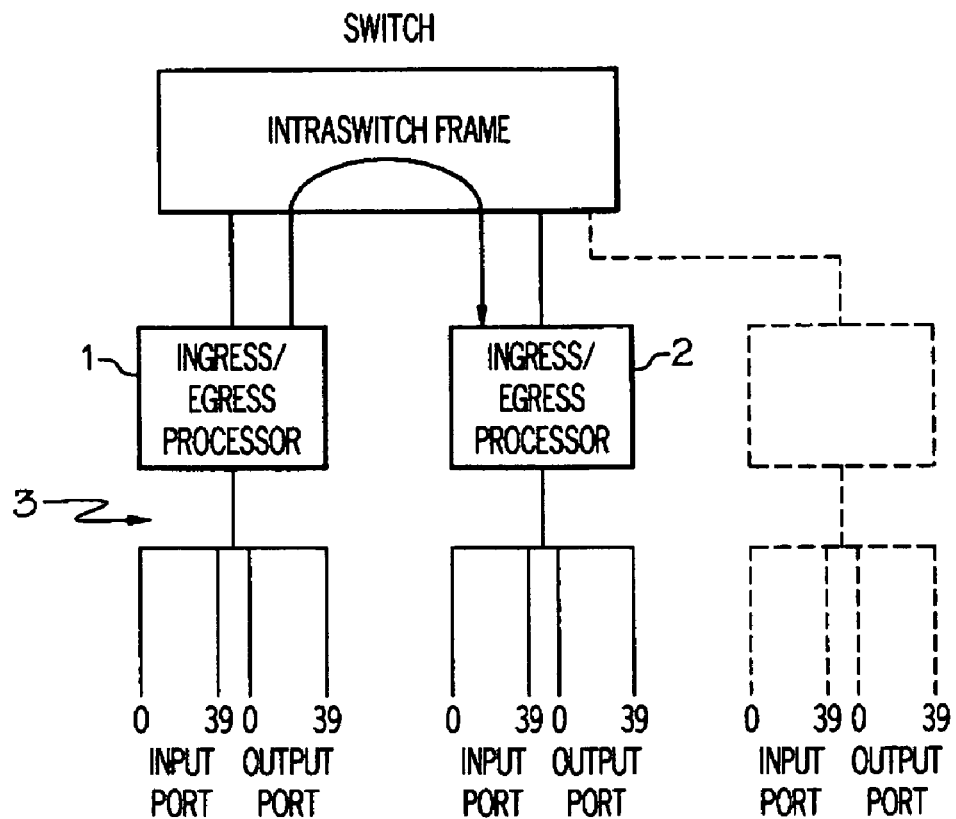
FIG. 1 illustrates the architecture of a switch which receives incoming frames and transfers the incoming frame to an egress network processor.

Network communications depend upon various components which can connect the segments of a network together such as network switches and bridges. Network switches may be organized in accordance with the architecture shown in FIG. 1, wherein data frames transmitted on the network are received on a port of the switch. Each switch has multiple blades 3 which support multiple input ports 0–39, output ports 0–39, and a blade processor. As illustrated in FIG. 1, input ports 0–39 associated with the first blade have an ingress processor 1 which receives the incoming frames to be routed by the switch. The received frames may be of different formats, depending on the various protocols served by the network switch. Processing of an incoming frame requires that the frame header information be parsed, and control parameters from the frame be derived to determine how the frame is to be processed.

Once the frame has been processed by the ingress processor 1, it can be handed off to the appropriate egress processor 2 which serves a port for transferring the frame to a destination address determined from the incoming frame. The egress processor 2 may be located on a different blade, or may be the ingress processor of the same blade, operating under a different set of pico code instructions.

The present invention takes advantage of the fact that a significant amount of the incoming frame processing which has already taken place in the ingress processor 1 need not be redundantly executed in the egress processor 2. The present invention simplifies processing for the egress processor 2 by passing an intra-switch frame containing data from the originating frame received by the switch, along with a header which contains control data prepared by the ingress processor 1. The control data contained in the intra-switch frame header may identify to the egress processor 2 the type of frame which was received from the network, parameters which were determined during processing by the ingress processor 1, as well as a level of processing of the received frame by the ingress processor 1 in the form of data for locating a starting address for the egress processor pico code. From this data, it will be possible to identify a starting address for the egress processor 2 which avoids redundant processing of information which was determined by the ingress' processor and is now contained in the intra-switch frame header.

Figure 2:
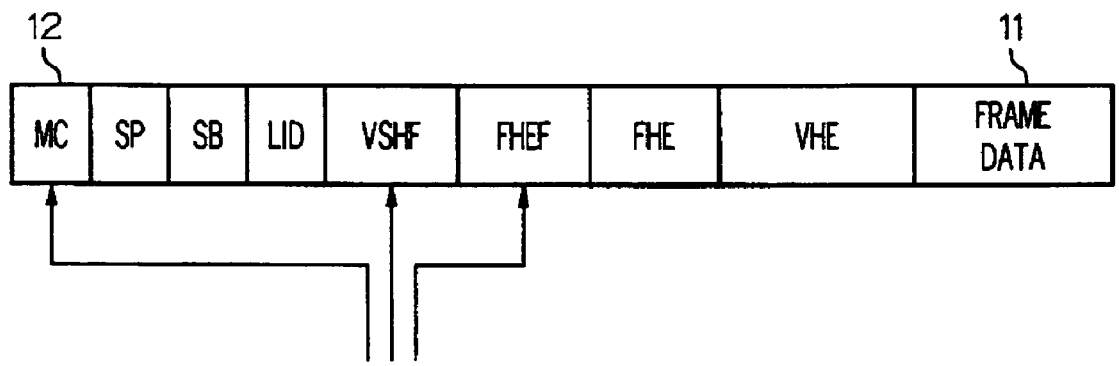
FIG. 2 illustrates the frame header data for the intra-switch frame prepared by the ingress processor.

The frame header for the intra-switch frame is more particularly shown in FIG. 2. Referring now to FIG. 2, the frame received from the network input port is shown as 11. A frame header 12 prepared by the ingress processor 1 includes a number of fields which will be used by the egress processor 2 to determine the starting point instruction for processing of the frame as well as additional parameters needed to complete the egress processing. A first field MC includes a one-bit index which identifies whether or not the frame being passed is a multicast or unicast frame. The field SP identifies the source port, the field SB identifies the source blade on which the frame entered the switch, and a parameter LID (lookup identifier) is in the following field.

The MC, variable software header format (VSHF), and frame header extension format (FHEF) are the main fields in the intra-switch frame header used to pass software execution control from the ingress processor 1 to egress processor 2.

When the variable header extension (VHE) field is used to specify control information, the VSHF field is programmed with data to indicate the data type and format which would appear in the VHE field. When a fixed amount of control information is adequate, the FHEF field indicates the number of bytes in the following FHE field and its format which the egress processor 2 will use during frame processing. The capability of using the variable length header extension field VHE is available for yet unforeseen frame protocols which are to be received over the network to permit control information for such frames.

By decoding data in these fields, the egress processor 2 can begin processing the frame at a starting instruction which takes advantage of the earlier processing performed by the ingress processor. The starting instruction address location can be determined from data in the frame header by a hardware frame classifier as will be described with respect to the egress processor operation. In this way, the egress processor 2 can jump to a starting address which reflects the frame type which was identified by the ingress processor, as well as the level of execution completed by the ingress processor.

In accordance with the preferred embodiment, the frame header 12 of FIG. 2 includes one bit in the MG field, two bits in the VSHF field, and two bits in the FHEF field which are exemplary only. The egress processor 2 has associated with it a hardware classifier which detects from the data in these three fields a five-bit code (one bit from the MC field, two bits each from the VFSH and VHVF fields). The five-bit code identifies at least 32 starting addresses for 32 different sets of pico code to be executed by the egress processor.

The set of instructions identified by the five bit code may thereafter process data contained within the FHE, or VHE fields, as called for by the instructions being executed. This provides the ability for the intra-switch frame header 12 to pass to the egress processor not only starting instruction information to the egress processor to begin processing a set of instructions, but actual parameter values which may have been previously determined by the ingress processor.

Figure 3:
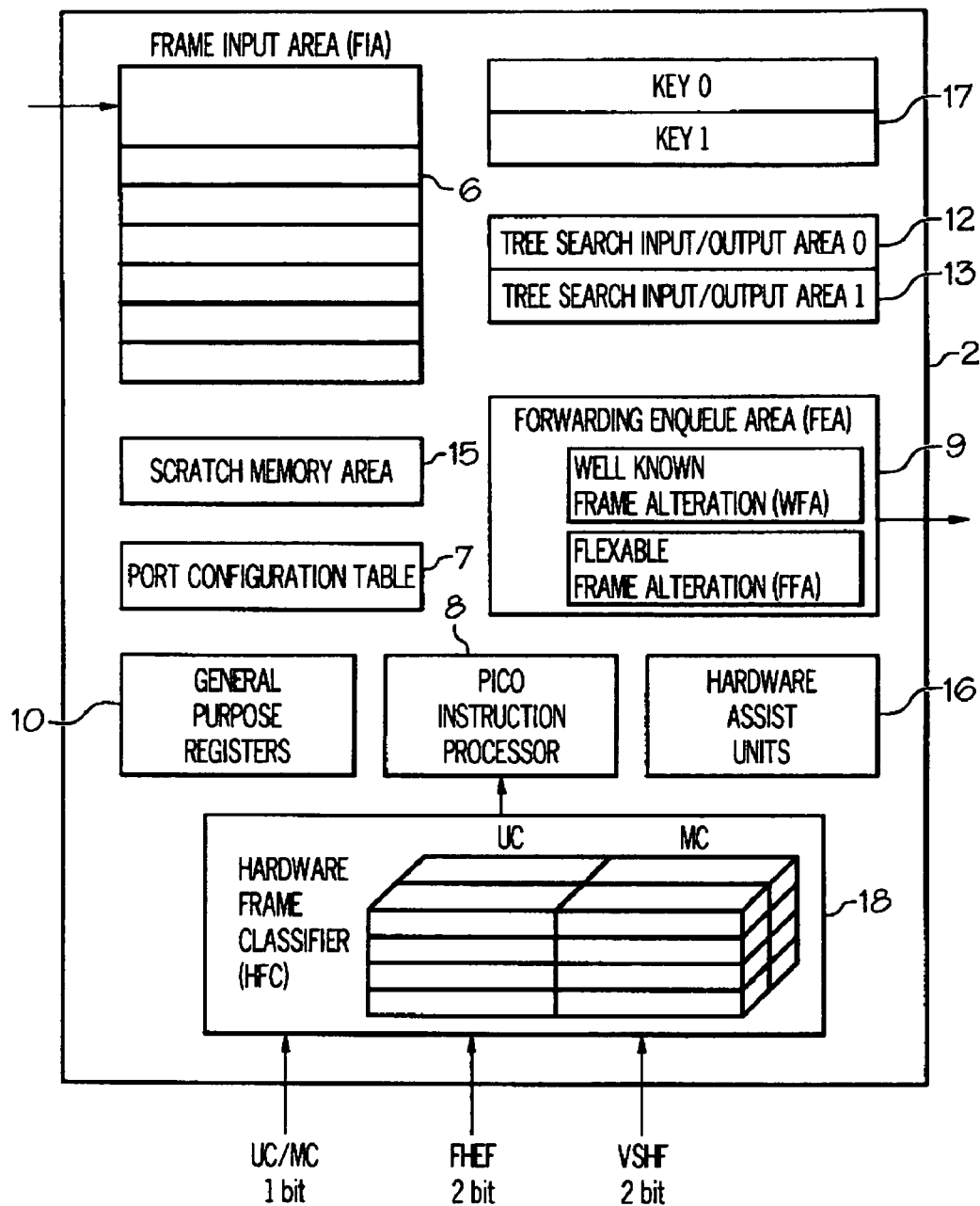
FIG. 3 is an illustration of the processor architecture for the egress processor of a network switch.

FIG. 3 illustrates the architectural organization of the egress processor 2 which receives the intra-switch frame. A frame input area FIA 6 defines a series of memory locations which receives the frame passed by the ingress processor. A copy of the first thirty-two bytes of the intra-switch frame shown in FIG. 2 is stored in the frame input area (FIA). A copy of the port configuration entry for the interface on which the incoming frame to the switch was received is stored in a port configuration table 7. The port configuration table 7 can be used in a default circumstance, when configuration data in the egress processor turns the hardware classifier off, and execution of the frame begins as in the prior art, without any advance knowledge of the frame type, or the depth of processing previously executed by the ingress processor.

Processor 8 executes an instruction set for processing the data stored in the frame input area (FIA) 6. The Forwarding Enque Area (FEA) 9 contains a list of ENQUE parameters, including well known frame alteration parameters (WFA) and flexible frame alteration parameters (FFA). Control structures are created for modifying the frame under control of the egress processor code. Processing of the frame is conventional in that search trees based on keys derived from the contents of the Frame Input Area (FIA) are created, and the results of that search produces other ENQUE parameters, as well as WFA and FFA which are stored in 9. Intermediate values obtained during these calculations are stored in the scratch memory 19 and general purpose registers 10. Hardware assist units 16 are also employed in the process for building the control structures in the Forwarding Enque Area.

In order to make use of the present invention, which seeks to avoid redundant processing by the egress processor 2, a hardware frame classifier 18 logic circuit is provided. The hardware frame classifier (HFC) 18 receives as information the control parameters from the header of FIG. 2 on the intra-switch frame. As shown in FIG. 2, the MC bit, the FHEF, VSHF bits from the header stored in frame input area FIA 6 are used to identify a starting instruction in processor 8 for commencing processing of the received frame. The decoding of the intra-frame header and selection of the instructions for commencing processing of the frame is shown in FIG. 4.

Figure 4:
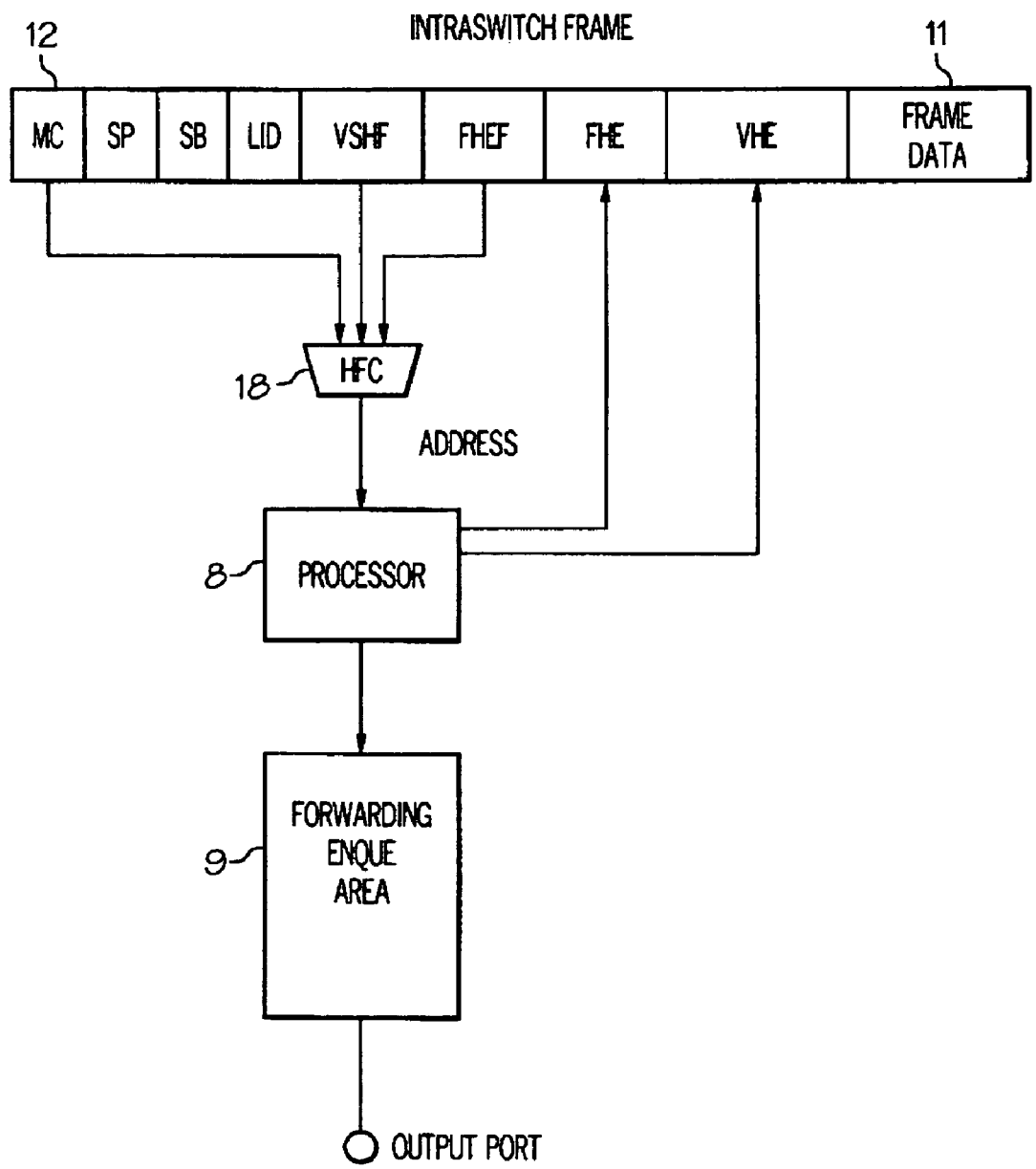
FIG. 4 illustrates the frame execution by the egress processor for intra-switch frames.

Referring now to FIG. 4, the frame header 12 for the intra-switch frame includes in the header a 2-bit extension format field FHEF. The 2-bits in the extension format field FHEF can serve to identify a particular protocol layer in which the incoming frame was received by the switch. The values of the two bits and the identity of the protocol layer can be as set forth in Table 1.

TABLE 1

| 00 | = | FHE = 0 bytes, default-bridging |
| 01 | = | FHE = 4 bytes, IPV4 |
| 10 | = | FHE = 4 bytes, SWJUMP |
| 11 | = | FHE = 4 bytes, encoded stake. |

For the data entry 00, no data appears in FHE, such as when the egress processor is doing a bridging function.

For the data entry 01, the routing function is used by the egress processor and the IPV4 address for the next hop is inserted in the FHE field as four bytes of information. Thus, when decoding the header fields, the hardware frame classifier 18 utilizes the 2-bit information to identify the location of the 4 bytes and its meaning.

The data 10 indicates to the hardware frame classifier that four bytes of information within the FHE field is a starting address for the egress processor execution. When the hardware frame classifier 18 indexes the processor to the starting address, subsequent code execution by the processor will recognize that within the FHE are four bytes identifying a jump instruction to which the processor is to begin processing. In this way, starting instructions are not limited to 32, the width of the 5-bit data, but may include others identified from the jump instruction.

The last entry in the table indicates the data entry 11 in the FHEF field identifies four bytes in the FHE field identifying the frame format. The FHE field contains the location of parameters forwarded by the ingress processor which may be used for processing the intra-switch frame having the identified format.

Two other bits which are provided to the hardware frame classifier are contained in the VSHF field. The VSHF field is related to the VHE field in that it specifies a number of bytes which appear in the VHE field in accordance with Table 2.

TABLE 2

| | | |
|---|---|---|
| 00 | = | VHE = 0 bytes |
| 01 | = | VHE = 4 bytes |
| 10 | = | VHE = 6 bytes |
| 11 | = | VHE = first byte, VHE length. |

These fields will permit further data generated from the ingress processor 1 to be inserted in the VHE field. Further, the data in the VHSF field can identify to the hardware frame classifier the parameter to which the data stored in the VHE field corresponds.

The two bits in the VSHF field can not only be decoded to indicate a particular parameter stored in the VHE field, but identifies the number of bytes in the VHE field containing the parameter. The last entry in Table 2, 11, identifies to the hardware frame classifier 18 that the VHE length data is contained in the first byte of the VHE field.

The fifth bit is from the MC field which identifies the frame as either a multicast or unicast frame to the hardware frame classifier 18.

The hardware frame classifier 18 includes a table which is indexed by the five bits input to the hardware frame classifier 18 from the foregoing MC, VSHF, FHEF fields. The five bits identify a starting address of the pico code instructions stored in the processor 8. Individual instructions following the starting address within the pico processor 8 may, in turn, look to the FHE fields, and VHE fields when the decoded output from the hardware frame classifier 18 points to the relevant set of instructions. For instance, when the FHE field is 10, a jump address is provided in the FHE field, which when the relevant instructions following the entry point of a set of instructions are executed, read the contents of the FHE field to obtain the jump instruction.

Likewise, other instructions which are pointed to as a result of decoding other combination of bits from the MC, VSHF, and FHEF fields by hardware classifier 18 will utilize parameters which have been stored in the FHE field or VHE field by the ingress processor, thus providing to the egress processor ready access to parameters previously computed by the ingress processor.

From the foregoing, the frame data is prepared in the forwarding enque area 9 for delivery to the output of the switch.

The egress processor can process multicast frames as well as unicast frames received from the ingress processor. The egress processor is associated with one or more output ports on the network switch and forwards the frame for transfer to a port identified from incoming destination information received from the incoming frame. When the egress processor wants to send a multicast frame out of several ports, it does so by queuing the multicast frame on each port the same way it would have been queued a unicast frame.

Thus, using the foregoing intra-switch frame, it is possible to pass off for execution control from the ingress processor to the egress processor so that redundant processing need not be carried out on the frame.

While the foregoing has been described with respect to a network switch, it should also be recognized that the principles are applicable within any network bridge, or in any network routing situation where frames must be processed a number of times by system components.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. In a network switching system having an ingress processor for receiving incoming frames from a port of a network, and an egress processor having a port through which said frames are delivered, a method for enhancing processor speed comprising:

forming at said ingress processor a header for each frame destined for said egress processor having data for identifying a beginning of a processing sequence for said egress processor; and decoding said data in said header in a hardware frame classifier into a starting address for said egress processor wherein decoding said data include indexing an address table in said hardware frame classifier; and executing processing from a starting address space identified by said table of said hardware classifier if said hardware classifier is enabled and executing processing of said frame beginning at a process execution level determined from a port configuration entry of the interface of the port said frame was received if a configuration bit of said egress processor indicates said hardware classifier has been disabled.

2. A network switch for enhancing execution of frame classification information comprising:

an ingress processor for parsing and recovering parameters from a frame and recovering the identity of said frame;

said ingress processor being further programmed to create a header for an intra-switch frame identifying said frame and a level of processing of said received frame;

an egress processor for receiving said intra-switch frame and for creating a frame for passing to one or more output ports, said egress processor being programmed to:

execute instructions which follow a starting address for completing processing of said frame;

forward said processed frame to an output port based on said processing of said frame; and a hardware frame classifier, includes an address table which decodes frame header extension values and variable frame extension values which point to said egress processor starting address location, for determining from said intra-switch frame header said starting address of said instructions which are to be processed wherein the level of processing of said received frame includes code for identifying a beginning address of picocode instructions stored in said egress processor and data generated by said ingress processor, to be used as required by said pico instructions being executed.

3. In a network switching system having an ingress processor for receiving incoming frames from a port of a network, and an egress processor having a port through which said frames are delivered, a method for enhancing processor speed by the egress processor comprising:

forming at said ingress processor a header for each frame destined for said egress processor said header having code for identifying a beginning address of picocode instructions stored in said egress processor; and decoding said code in said header in a hardware frame classifier into a starting address in said picocode for said egress processor if said classifier is enabled otherwise executing processing of a frame beginning at a process execution level determined from a port configuration entry of the interface of the port said frame was received if a configuration bit of said egress processor indicates said hardware classifier has been disabled.

4. The method for enhancing processing according to claim 3 wherein said frame header includes control information for said egress processor which distinguish said frames as being multicast or unicast.

5. The method for enhancing processing according to claim 3 wherein said egress processor creates multiple frames for multiple output ports when said frame header contains multicast data.

6. In a network switching system having an ingress processor for receiving incoming frames from a port of a network, and an egress processor having a port through which said frames are delivered, a method for enhancing processor speed by the egress processor comprising:

forming at said ingress processor a header for each frame destined for said egress processor having code for identifying a beginning address of picocode stored in said egress processor; and decoding data in said header in a hardware frame classifier into a starting address in said picocode for said egress processor wherein decoding said code include indexing an address table in said hardware frame classifier; and executing processing from a starting address space identified by said table of said hardware classifier if said hardware classifier is enabled, otherwise executing processing of a frame beginning at a process execution level determined from a port configuration entry of the interface of the port said frame was received if a configuration bit of said egress processor indicates said hardware classifier has been disabled.

7. A network switch for enhancing execution of frame classification information comprising:

an ingress processor for parsing and recovering parameters from a frame and recovering the identity of said frame;

said ingress processor being further programmed to create a header for an intra-switch frame identifying a received frame and a level of processing of said received frame;

an egress processor for receiving said intra-switch frame and for creating a frame for passing to one or more output ports, said egress processor being programmed to:

a hardware frame classifier for determining from said intra-switch frame header a starting address of said instructions which are to be processed;

executing processing of a frame beginning at a process execution level determined from a port configuration entry of the interface of a port said frame was received if a configuration bit of said egress processor indicates said hardware classifier has been disabled; and forward said processed frame to an output port based on said processing of said frame.

8. The network switch according to claim 7 wherein said hardware frame classifier includes an address table which decodes frame header extension values and variable frame extension values which point to said egress processor starting address location.

9. The network switch according to claim 7 wherein said frame header includes a field to identify said frame as being a multicast frame.

10. The network switch according to claim 7 wherein said frame header data is stored in fixed length fields which have a length determined by a length field in said header.

11. In a network switching system having an ingress processor for receiving incoming frames from a port of a network, and an egress processor having a port through which said frames are delivered, a method for enhancing processor speed comprising:

forming at said ingress processor a header for each frame destined for said egress processor said header having data identifying parameters computed by said ingress processor and code identifying a starting address of picocode instructions stored in said egress processor; and decoding said code in said header in a hardware frame classifier into the starting address in said picocode for said egress processor if said classifier is enabled otherwise executing processing of a frame beginning at a process execution level determined from a port configuration entry of the interface of the port said frame was received if a configuration bit of said egress processor indicates said hardware classifier has been disabled.

12. In a network switching system having an ingress processor for receiving incoming frames from a port of a network, and an egress processor having a port through which said frames are delivered, a method for enhancing processor speed by the egress processor comprising:

forming at said ingress processor a header for each frame destined for said egress processor said header having data for identifying a beginning of a processing sequence for said egress processor and control information for said egress processor which distinguish said frames as being multicast frame or unicast frame; and decoding said data in said header in a hardware frame classifier into a starting address for said egress processor if said classifier is enabled otherwise executing processing of a frame beginning at a process execution level determined from a port configuration entry of the interface of the port said frame was received if a configuration bit of said egress processor indicates said hardware classifier has been disabled.

13. The method of claim 12 wherein the control information includes a single bit when set to a first state indicates the unicast frame and when set to a second state indicates the multicast frame.

14. In a network switching system having an ingress processor for receiving incoming frames from a port of a network, and an egress processor having a port through which said frames are delivered, a method for enhancing processor speed by the egress processor comprising:

forming at said ingress processor a header for each frame destined for said egress processor having data for identifying a beginning of a processing sequence for said egress processor;

decoding said data in said header in a hardware frame classifier into a starting address for said egress processor if said classifier is enabled otherwise executing processing of a frame beginning at a process execution level determined from a port configuration entry of the interface of the port said frame was received if a configuration bit of said egress processor indicates said hardware classifier has been disabled; and creating multiple frames for multiple output ports when said frame header contains multicast data.

\* \* \* \* \*